United States Patent
Hoffman et al.

(10) Patent No.: US 8,094,516 B2
(45) Date of Patent: Jan. 10, 2012

(54) METHOD AND DEVICE FOR THE TIME-SERIAL TRANSMISSION OF RECEPTION SIGNALS OF ELECTROACOUSTIC TRANSDUCERS

(75) Inventors: Peter Hoffman, Achim-Baden (DE); Kersten Mölck, Achim (DE); Eberhard Schmidt, Bremen (DE)

(73) Assignee: Atlas Elektronik GmbH, Bremen (DE)

( * ) Notice: Subject to any disclaimer, the term of this patent is extended or adjusted under 35 U.S.C. 154(b) by 276 days.

(21) Appl. No.: 12/311,778

(22) PCT Filed: Oct. 10, 2007

(86) PCT No.: PCT/EP2007/008798
§ 371 (c)(1),
(2), (4) Date: May 26, 2009

(87) PCT Pub. No.: WO2008/052641
PCT Pub. Date: May 8, 2008

(65) Prior Publication Data
US 2010/0034246 A1  Feb. 11, 2010

(30) Foreign Application Priority Data
Oct. 30, 2006  (DE) .......................... 10 2006 051 065

(51) Int. Cl.
*G01V 1/22* (2006.01)

(52) U.S. Cl. ....... 367/79; 367/76; 340/855.2; 340/855.3

(58) Field of Classification Search ................ 367/60, 367/76, 79; 340/855.2, 855.3
See application file for complete search history.

(56) References Cited

U.S. PATENT DOCUMENTS

| | | | | |
|---|---|---|---|---|
| 3,873,961 A | * | 3/1975 | Lee et al. | 367/79 |
| 4,281,403 A | * | 7/1981 | Siems et al. | 367/76 |
| 4,509,170 A | * | 4/1985 | Hollinger et al. | 370/458 |
| 4,787,069 A | * | 11/1988 | Beauducel et al. | 367/21 |
| 2004/0105341 A1 | | 6/2004 | Chamberlain et al. | |

FOREIGN PATENT DOCUMENTS

| | | |
|---|---|---|
| DE | 31 51 028 | 7/1983 |
| DE | 197 05 365 | 8/1998 |
| EP | 0 689 188 | 6/1995 |
| GB | 2148501 | 10/1983 |

* cited by examiner

*Primary Examiner* — Ian Lobo
(74) *Attorney, Agent, or Firm* — Fitch, Even, Tabin & Flannery; Norman N. Kunitz

(57) ABSTRACT

A method for the time-serial transmission of received signals of electroacoustic transducers (11), which are placed at different transducer locations (13) of a spatially spread receive arrangement (10), to a signal processing unit (12), in which at each transducer location (13) the received signals are digitized by an electronic module (20), and the digitized received signals are switched onto a data line (14, 15, 16) leading to the signal processing unit (12) in the timing pattern of a synchronization clock. To obtain a high data rate with undisturbed data transmission, the intrinsic switching-time errors of the electronic modules (20) are measured with respect to the switching times defined by the timing pattern, and compensated for at the transducer locations (13) by individual time delay of the signals to be switched.

11 Claims, 3 Drawing Sheets

METHOD AND DEVICE FOR THE TIME-SERIAL TRANSMISSION OF RECEPTION SIGNALS OF ELECTROACOUSTIC TRANSDUCERS

CROSS-REFERENCE TO RELATED APPLICATIONS

This is a U.S. National Phase of International Application PCT/EP2007/008798, filed Oct. 10, 2007, and claims the benefit of foreign priority under 35 U.S.C. §119 of German Patent Application No. 10 2006 051 065.8, filed Oct. 30, 2006, the entire disclosures of which are hereby incorporated by reference herein.

BACKGROUND OF THE INVENTION

The invention relates to a method and a device for the time-serial transmission of receive signals of electroacoustic transducers according to the preamble of claim 1.

A known circuit arrangement, also called an electronic module, for time-serial transmission of receive signals onto a data line or a bus (EP 0 689 188 B1) is assigned a respective transducer location of a spatially spread receive arrangement composed of a multiplicity of electroacoustic transducers, and connected at this location to the transducer and a synchronization line routed via all the transducer locations. The synchronization pulses transmitted on the synchronization line are generated by a master-clock generator. The frequency of the master-clock generator is specified by the sampling theorem for the receive signals in the highest receive frequency range, the multiplicity of transducer locations and a defined bit length for digitizing the receive signal at the output of the transducer. A clock generator of the circuit arrangement doubles the frequency of the master-clock generator and supplies clock pulses for digitizing and transmitting the digitized receive signals. In the interval between two sequential synchronization pulses, a timing pattern containing pattern pulses is generated by a counter from the clock pulses of the clock generator, and a gate is opened on a specific pattern pulse, and the digitized receive signal stored in a shift register of the circuit arrangement is transmitted onto the data line via the opened gate. Since within the timing pattern at each pattern pulse, a digitized signal as a data packet of a specific bit length is always switched onto the data line at one of the transducer locations, the timing pattern must be suitably designed to prevent the data packets overlapping. Tolerances in the components of the individual circuit arrangements at the transducer locations, e.g. in the propagation delay of the components, always result in the actual switching of the respective data packet being shifted with respect to the pattern pulse, which means that sufficiently large time gaps must be kept between the sequential data packets for error-free signal transmission. As a result, limits are set to the value of the clock frequency of the timing pattern, referred to below as the timing-pattern frequency, and to the data rate that can hence be transmitted on the data line. In order to transmit large volumes of data, a plurality of parallel data lines are used. Each data line performs the data transfer from a section of the transducer locations to the receive installation.

The object of the invention is to improve a method and a device of the type cited in the introduction so as to achieve a data transmission having a higher timing-pattern frequency and hence better utilization of the data line.

SUMMARY OF THE INVENTION

The object is achieved according to the invention by the features of claim 1 and of claim 6 respectively.

The method according to the invention and the device according to the invention have the advantage that by compensating for the intrinsic timing errors of the electronic modules without changing the bit length of the data to be transmitted, such large time gaps no longer need to be kept between successive switching of the data at the individual transducer locations in order to be certain that the data packets do not overlap on the transmission path, because without the inventive compensation of the timing errors it was previously always necessary to keep each respective time gap between the end of the previous data packet and the start of the subsequent data packet at least so large as to be able to take up a maximum delay occurring at any electronic module. Thanks to the switching times at the transducer locations, which are now individually set and differ from the timing pattern, and which take account of the individual timing errors of the electronic modules, all sequential data packets are separated from each other by an approximately constant time interval, which can be made very small because of its invariance. The reduction now possible in the time intervals between the data packets means that the time intervals of the pattern pulses can also be shortened and hence the timing-pattern frequency of the timing pattern lying within a synchronization-pulse interval can be increased significantly e.g. doubled. This is accompanied by higher utilization of the data line, so that substantially more transducer locations can be connected to the data line, and the data packets can be transmitted at a faster rate to the signal processing unit.

Claims 2 to 5 contain practical embodiments of the method according to the invention, including advantageous developments and designs of the invention. Claims 7 to 10 contain practical embodiments of the device according to the invention, including advantageous developments and designs of the invention.

According to an advantageous embodiment of the invention, the individual time delays of the signals to be switched at the different transducer locations, which are required to compensate for the timing errors or switching-time errors, are determined from the time difference between the measured largest switching-time error and the switching-time error of the electronic module measured at the respective transducer location.

According to an advantageous embodiment of the invention, parallel data lines are used in order to be able to transmit a larger number of signals or items of data for a fully utilized data line, with a number of transducer locations always been connected to the data lines in the manner according to the invention. Since the data lines have different signal propagation delays, and since it is imperative for online signal processing, e.g. for beam-forming, that all the digitized signals from all the transducer locations are available simultaneously before the end of a synchronization interval, according to an advantageous embodiment of the invention, the signal propagation delays on all the data lines are measured, and all the signals or data transmitted on the data lines are delayed to the measured longest signal propagation delay.

Measuring the timing errors and signal propagation delays, and determining and setting the time delays, are performed either manually when switching on the receive arrangement or automatically during online operation. Automatic measurement and time compensation are particularly advantageous in receive arrangements on a submarine, because the propagation delays along the data lines vary with the operating depth of the submarine.

According to an advantageous embodiment of the invention, this is done by the means that, at the end of a data line, all the signals transmitted on the same data line are retrieved from the data line with an identical time delay. The delay for the signals transmitted on the same data line is set to equal the time difference between the longest signal propagation delay measured on all the parallel data lines and the individual signal propagation delay on this data line.

BRIEF DESCRIPTION OF THE DRAWINGS

The invention is described in greater detail below with reference to an exemplary embodiment of a device for signal or data transmission, which is shown in the drawing in which.

DETAILED DESCRIPTION OF THE INVENTION

Figure 1:
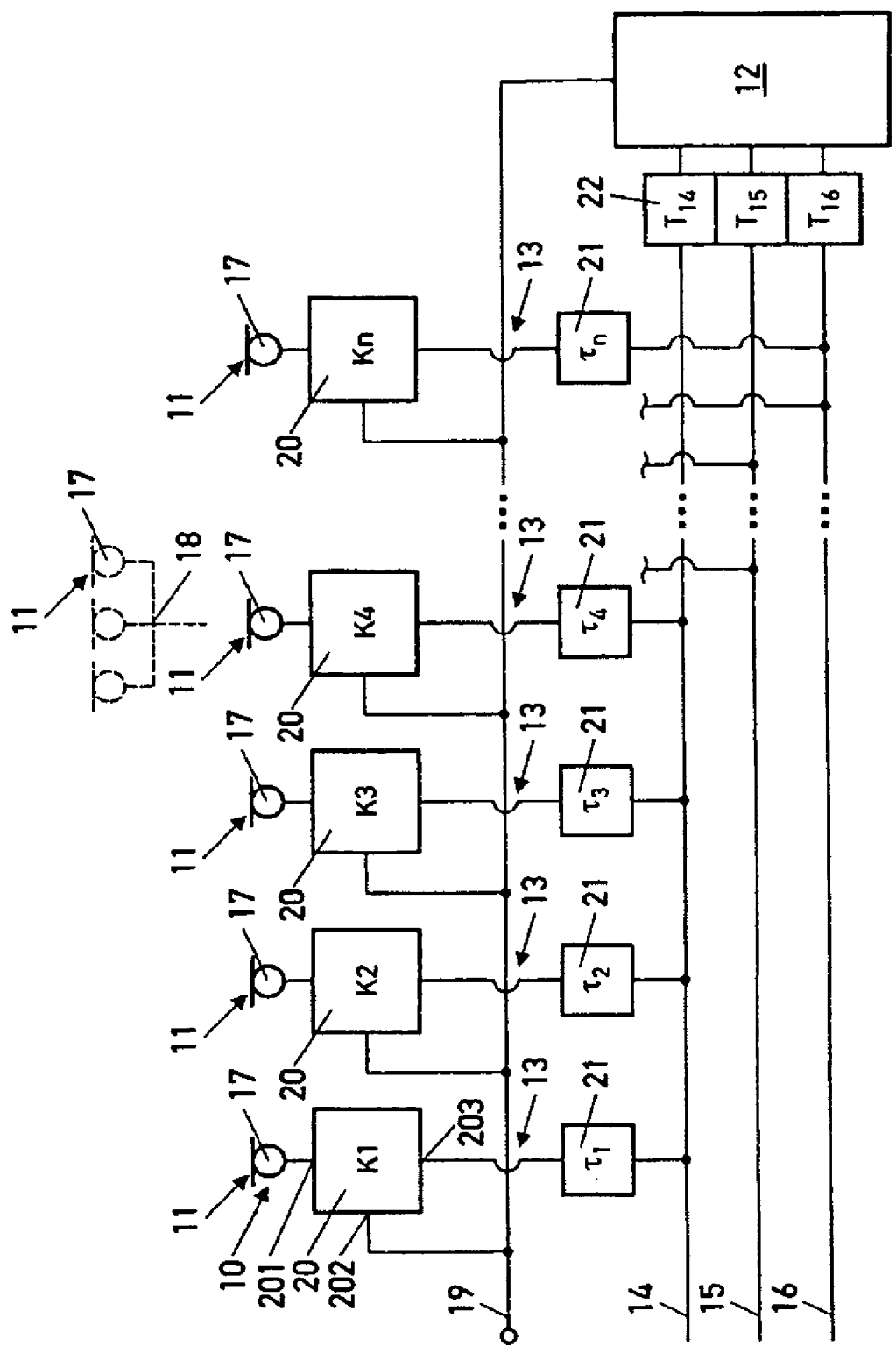
FIG. 1 shows a circuit diagram of a device for time-serial transmission of receive signals of electroacoustic transducers.

The device shown in FIG. 1 in the circuit diagram enables time-serial transmission of receive signals of electroacoustic transducers 11 of a spatially spread receive arrangement 10 to a central signal processing unit 12. The transducers 11 are placed at different transducer locations 13, and their receive signals are transmitted via a plurality, in the exemplary embodiment of FIG. 1, three parallel data lines 14, 15, 16, also called buses. The transducer locations 13 may be located in a towed antenna or in a regular or random arrangement on the surface of a carrier e.g. a submarine. Each electroacoustic converter may be a single hydrophone 17 or a group 18 of interconnected hydrophones 17, such a group being shown dashed in FIG. 1. A synchronization line 19 is routed to all transducer locations 13, its input being connected to a master-clock generator (not shown here), which supplies synchronization pulses at the synchronization frequency onto the synchronization line 19. Two of these synchronization pulses are shown by way of example in FIG. 2.1.

Figure 2:
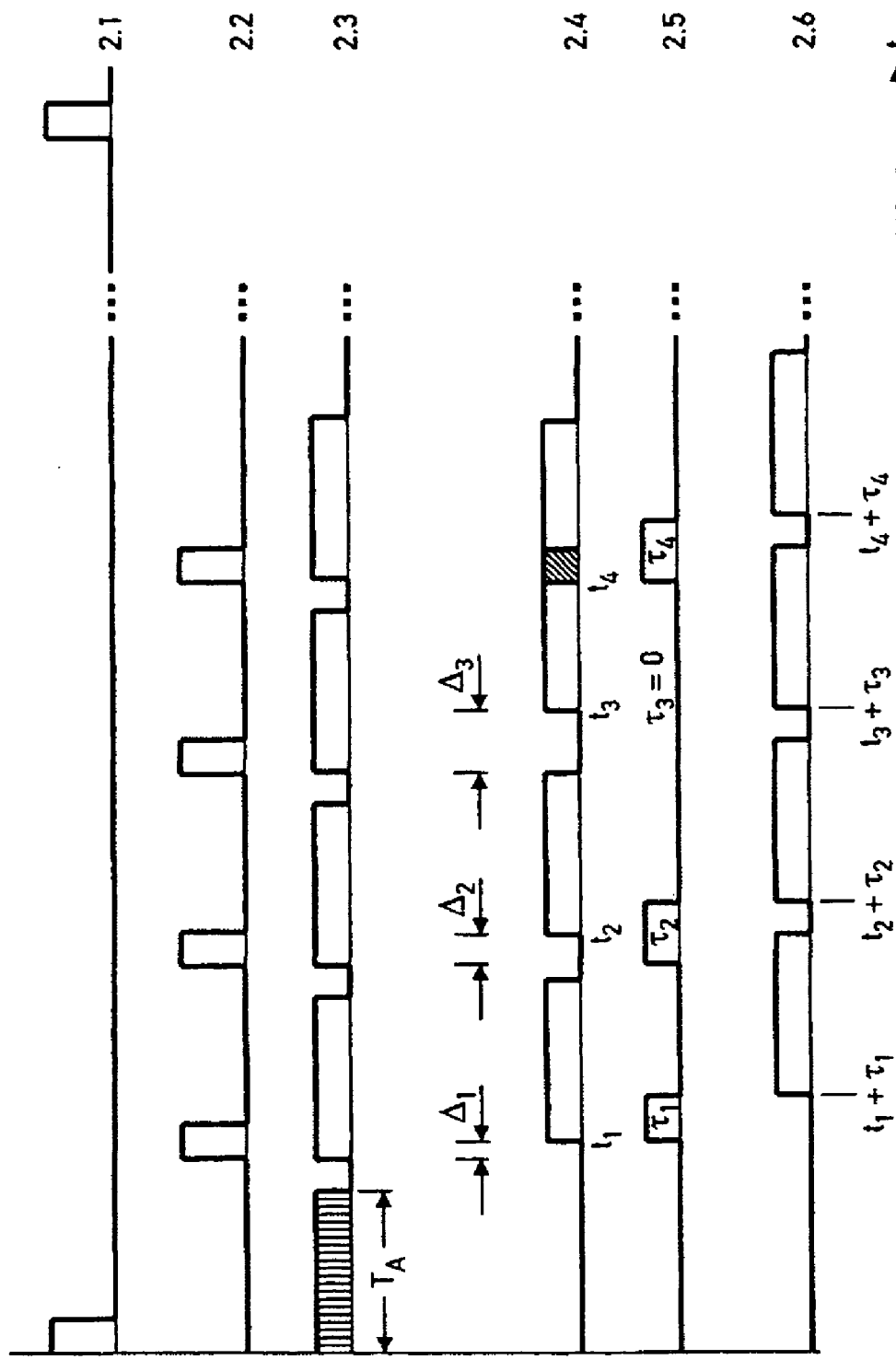
FIG. 2 shows a set of different timing diagrams to illustrate the method of signal transmission according to the invention.

Each transducer location 13 is assigned an electronic module 20, which has a signal input 201 connected to the transducer 11, an input 202 connected to the synchronization line 13, and a signal output 203. In each electronic module 20, the receive signals applied to its signal input 201 are digitized and switched onto one of the three data lines 14, 15 or 16 at a point in time. The point in time is determined by a timing pattern, which is derived from the synchronization pulses present on the synchronization line 19. EP 0 689 188 B1, which is referred to in this regard, describes the design and operation of such an electronic module 20. The synchronization clock, i.e. the clock frequency of the master-clock generator at the start of the synchronization line 19, is specified by the sampling theorem for the receive signals in the highest receive frequency range, the multiplicity of transducer locations 13 and a defined bit length for digitizing the receive signal at the signal input 201. The frequency of the master-clock generator is multiplied in a clock generator present in the electronic module 20, and supplies the clock pulses for digitizing the receive signals present at the signal input 201. In addition, the timing pattern defined by the synchronization clock and comprising pattern pulses for transmitting the digitized receive signals from the electronic module 20 onto one of the data lines 14 to 16 is generated by the clock generator using a counter, where the counter counts the clock pulses from the clock generator, and a pattern pulse is output when a count that is individually defined for the electronic module 20 is reached. FIG. 2.2 shows by way of example four pattern pulses of the timing pattern, which are generated in four electronic modules 20 at four different transducer locations 13 assigned to the same data line 14. The respective pattern pulse opens a gate, and the digitized receive signal stored in a shift register is transmitted as a digital data packet via the opened gate onto the respective data line 14 to 16. Between two synchronization pulses, the receive signals at all the transducer locations 13 are sampled and transmitted to the signal processing unit 12. A new sampling and transmission cycle begins with each synchronization pulse, with the receive signals at all the transducer locations 13 initially being digitized and stored in a shift register in the time interval $T_A$ (FIG. 2.3). The shift register is read out when the respective pattern pulse occurs at the respective transducer location 13, and the digitized signal as a data packet is switched onto the respective data lines 14, 15, or 16.

In FIG. 1 by way of example, the electronic modules 20 denoted by K1 to K4 are assigned to the data line 14, and the electronic module 20 denoted by Kn is assigned to the data line 16, which can obviously be assigned further electronic modules K(n-1), K(n-2) etc. Electronic modules 20 of other transducer locations 13 are assigned to the data line 15 in a manner not shown in further detail here. Thus the first pulse of the pattern pulses shown in FIG. 2.2 opens the gate in the electronic module K1, the second pulse opens the gate in the electronic module K2, the third pulse opens the gate in the electronic module K3 and the fourth pulse opens the gate in the electronic module K4. Hence with each gate opening, a data packet corresponding to a digital receive signal stored in the shift register would theoretically be switched onto the data line 14.

All components and units in the electronic modules 20 are by nature subject to tolerances, resulting in a timing error of the electronic modules 20. Such a timing error manifests itself in the manner that the respective data packet of the digitized receive signal is switched onto the respective data line 14, 15 or 16 at a point in time that is earlier or later than the times theoretically specified by the pattern pulses of the timing pattern. This is illustrated in the timing diagrams of FIG. 2. FIG. 2.2 here shows the theoretical occurrence of the pattern pulses and FIG. 2.3 shows the data packets theoretically transmitted onto the data lines 14, 15, 16 when the pattern pulses occur at the different transducer locations 13. For components that are not subject to tolerances, each data packet would be switched onto the data line with the edge of the pattern pulse. In reality, however, because of different propagation delays of the components and general tolerances, the data packets are switched at points in time that are shifted in time by a time difference Δ with respect to the theoretical times. By way of example in the timing diagram of FIG. 2.4, the data packet is switched onto the data lines 14, 15, 16 by electronic module K1 at time $t_1$ having a time difference $\Delta_1$, by electronic module K2 at time $t_2$ having a time difference $\Delta_2$, by electronic module K3 at time $t_3$ having a time difference $\Delta_3$ and by electronic module K4 at time $t_4$ with no time difference with respect to the respective pattern pulse. If the timing-pattern frequency is set too high, i.e. the time interval between the pattern pulses is too small, then these time differences can cause the data packets to overlap and hence produce errors in the signal transmission. This is illustrated in FIG. 2.4 by way of example for the data packets of the electronic modules K3 and K4, which are switched onto the data line 14 at the times $t_3$ and $t_4$. The data packets overlap here in the shaded region.

Figure 3:
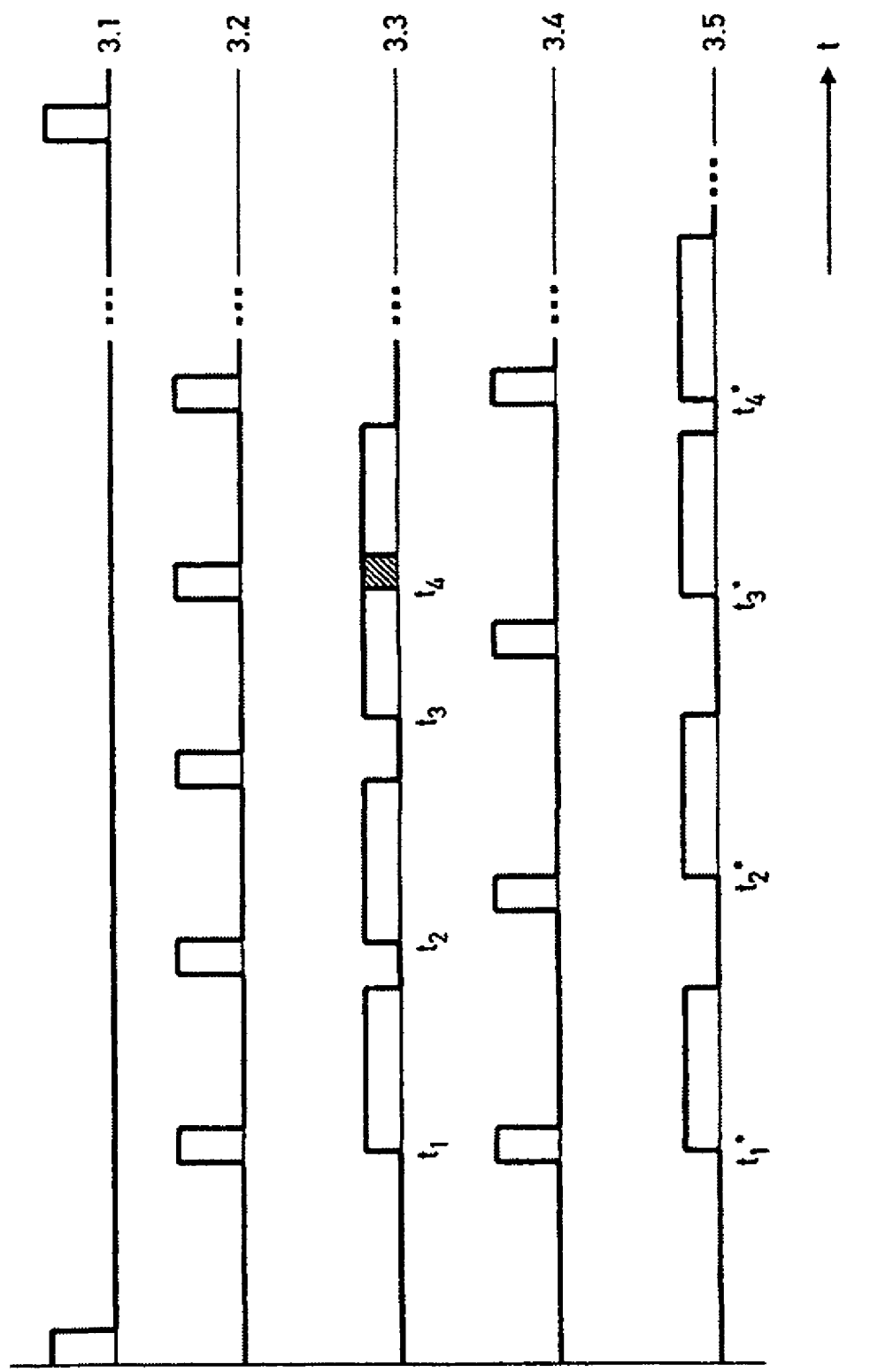
FIG. 3 shows a set of timing diagrams equivalent to FIG. 2 where the method according to the invention is not used.

Such overlaps are avoided in the prior art by selecting a relatively low timing-pattern frequency so that the switching times lie sufficiently far apart for the data packets switched onto the data line 14 at the different transducer locations 13 not to come into contact with each other in the time domain. This is illustrated in FIG. 3, where FIG. 3.1 again shows the interval shown in FIG. 2.1 containing two of the sequential synchronization pulses on the synchronization line 19, and FIG. 3.2 again shows the identical timing pattern shown in FIG. 2.2 of the pattern pulses occurring in the individual transducer locations 13. In order to avoid the overlap of the data packets switched by the electronic module K3 and electronic module K4 onto the data line 19 given the switching timing errors of four electronic modules 20 at four transducer locations 13 that are assumed by way of example in FIG. 3.3 and adopted from FIG. 2.4, the timing-pattern frequency is reduced compared with the timing-pattern frequency in FIG. 3.2, as shown in FIG. 3.4. As shown in FIG. 3.5, this means that the data packets switched by the electronic module K3 and by the electronic module K4 are separated from each other by a time interval and no longer exhibit an overlap region. Having to accept a low timing-pattern frequency is a disadvantage, however. For example, if the timing-pattern frequency in FIG. 3.2 equals 500 Hz, then the timing-pattern frequency required to avoid the overlap in FIG. 3.5 is just 350 Hz. A lower data transmission rate must be accepted with the low timing-pattern frequency, so that data packets can be transmitted from a lower number of transducer locations 13 in a time interval equal to that shown in FIG. 3.1.

In order to avoid such overlaps of the data packets switched onto the same data line 14, 15 or 16 respectively at different transducer locations 13 while still retaining dense packing of the data packets on the respective data line 14, 15 or 16 to achieve a high data rate, according to the method presented here, the timing errors or switching-time errors of all electronic modules 22 at the transducer locations 13, which use a common data line to transmit the receive signals, are measured and compensated for at the transducer locations 13 by individual time delay of the signals or data packets to be switched. Delay elements 21 having individually set delays $\tau$ are provided for this purpose and arranged between the signal output 203 of the electronic modules 20 and the data line 14, 15, 16 (FIG. 1). Each of the set individual delays $\tau$ equals the time difference between the largest switching-time error, which has been measured at one of the transducer locations 13 sharing a common data line 14, 15, 16 respectively, and the switching-time error measured at the individual transducer location 13.

In the exemplary embodiment of FIG. 1, the transducer locations 13 having the electronic modules K1 to K4 are assigned to the transmission line 14. As shown by way of example in FIG. 2.4, the electronic module K3 has the largest switching-time error $\Delta_3$. Compared with this, the electronic module K2 has a smaller switching-time error $\Delta_2$, and the electronic module K1 has the even smaller switching-time error $\Delta_1$. The electronic module K4 is not supposed to have any switching-time error. Using the statement above, the delay $\tau_1=\Delta_3-\Delta_1$ is hence determined for the electronic module K1, the delay $\tau_2=\Delta_3-\Delta_2$ for the transducer location 13 having electronic module K2, the delay $\tau_3=0$ for the transducer location 13 having the electronic module K3, and the delay $\tau_4=\Delta_3$ for the transducer location 13 having the electronic module K4. The transducer location 13 having electronic module Kn does not need to be taken into account because it is switched onto the data line 16 and must be dealt with in conjunction with the other transducer locations 13 assigned to the data line 16. The delays $\tau$ are shown in FIG. 2.5. As FIG. 2.6 shows, the data packet is thus transmitted onto the data line 14 at the time $t_1+\tau_1$ at the transducer location 13 having the electronic module K1, at the time $t_2+\tau_2$ at the transducer location 13 having the electronic module K2, at the time $t_3+\tau_3$ at the transducer location 13 having the electronic module K3 and at the time $t_4+\tau_4$ at the transducer location 13 having the electronic module K4. As shown in FIG. 2.6, the data packets are closely packed and do not overlap. Error-free transmission having a high data rate is thereby achieved on the data line 14.

The three data lines 14, 15, 16 operated in parallel typically have different signal propagation delays. It is crucial for online signal processing, however, that the receive signals from all the transducer locations 13 are available simultaneously. In order to guarantee this, the signal propagation delays on all the data lines 14, 15, 16 are measured and all the signals transmitted on the data lines 14, 15, 16 are delayed in time to the measured longest signal propagation delay. This is done by all of the signals transmitted on the same data line 14, 15 or 16 respectively being output with an identical time delay at the end of the data line. The delay for the signals on each respective data line 14, 15 or 16 equals the time difference between the longest signal propagation delay measured when measuring the signal propagation delays of all the data lines 14, 15, 16 and the individual signal propagation delay on the respective data line 14, 15 or 16. In FIG. 1, the delay elements are grouped in a compensation element 22 and their delays are denoted by $T_{14}$, $T_{15}$ and $T_{16}$. If, for instance, the longest signal propagation delay $SL_{16}$ is measured on the data line 16, then one obtains $T_{14}=SL_{16}-SL_{14}$ and $T_{15}=SL_{16}-S_{15}$, where $SL_{14}$ is the signal propagation delay of the data line 14 and $SL_{15}$ is the signal propagation delay of the data line 15.

Instead of the individual delay elements 22, a buffer memory can also be provided into which all the data is read in, and which is read out in parallel after a time interval that equals the difference between the slowest and the fastest signal propagation delay on the data lines 14, 15, 16.

The spatially spread receive arrangement 10 can be implemented by different known antenna configurations, for instance as an acoustic section of a sheathed antenna, e.g. of a vertical antenna or towed antenna, known as a towed array system (TOS), comprising a multiplicity of transducers at transducer locations ranked one behind the other, as a flank antenna on the hull of a submarine, known as a flank array system (FAS), as three transducer groups for a passive remote sensing system (PRS), where a transducer group is arranged at each of three widely spaced transducer locations, as a hydrophone arrangement distributed over the submarine and forming part of an intercept detection ranging sonar (IDRS), as a measurement arrangement for self-noise analysis on board a submarine (ONA, ACC), in which structure-borne noise transducers are arranged at different transducer locations, e.g. in the vicinity of the drive and tower.

The invention claimed is:

1. A method for the time-serial transmission of receive signals of electroacoustic transducers, which are placed at different transducer locations of a spatially spread receive arrangement, to a signal processing unit, in which at each transducer location the receive signals are digitized by an electronic module, and the digitized receive signals are switched onto a data line leading to the signal processing unit in the timing pattern of a synchronization clock, wherein the intrinsic switching-time errors of the electronic modules are measured with respect to the switching times defined by the timing pattern, and compensated for at the transducer locations by individual time delay of the signals to be switched.

2. The method as claimed in claim 1, wherein the individual time delay made at a transducer location is set to equal the time difference between the measured largest switching-time error and the individual switching-time error measured at this transducer location.

3. The method as claimed in claim 1, wherein parallel data lines are used to transmit the signals, in that the signal propagation delays on all the data lines are measured, and in that all the signals switched onto the data lines are delayed to the measured longest signal propagation delay.

4. The method as claimed in claim 3, wherein at the end of a data line, all the signals transmitted over the same data line are output with an identical time delay.

5. The method as claimed in claim 4, wherein the delay for the signals on the same data line is set to equal the time difference between the longest signal propagation delay measured on the parallel data lines and the individual signal propagation delay measured on the data line.

6. The method as claimed in claim 1, wherein the switching-time error and the signal propagation delays are measured and compensated for manually when switching on or automatically online.

7. A device for the time-serial transmission of receive signals of electroacoustic transducers, which are placed at different transducer locations of a spatially spread receive arrangement, to a signal processing unit, having electronic modules assigned to the transducer locations and each connected to one transducer for digitizing the receive signals and for switching the digitized receive signals onto a data line leading to the signal processing unit at points in time defined by the timing pattern of a synchronization clock, wherein each electronic module is assigned a delay element having an individual time delay set according to the switching-time error of the electronic module.

8. The device as claimed in claim 7, wherein the delay element is arranged between signal output of the electronic module and the data line.

9. The device as claimed in claim 7, wherein the individual time delay set in the delay element equals the time difference between a largest switching-time error measured at the electronic modules of a data line and the individual switching-time error measured of the electronic module.

10. The device as claimed in claim 7, wherein, to transmit the receive signals, the transducer locations are distributed over a plurality of parallel data lines having known signal propagation delays, and that a compensation element is arranged at the end of the data lines, which adjusts the signal propagation delays of all the data lines to the longest signal propagation delay of the slowest data line.

11. The device as claimed in claim 10, wherein the compensation element comprises delay elements having individually set delays, each of these delay elements being connected between one of the data lines and the signal processing unit and having an individually set delay, which equals the time difference between the longest signal propagation delay occurring on the parallel data lines and the individual signal propagation delay of the data line to which the delay element is connected.

\* \* \* \* \*